United States Patent
G et al.

(10) Patent No.: US 9,310,865 B2
(45) Date of Patent: Apr. 12, 2016

(54) METHOD AND SYSTEM FOR OPTIMIZING A COMPOSITE LOAD DISAGGREGATION

(71) Applicant: Tata Consultancy Services Limited, Maharashtra (IN)

(72) Inventors: Goutam Y G, Karnataka (IN); Swanand Kadhe, Karnataka (IN); Mariswamy Girish Chandra, Karnataka (IN); Balamuralidhar Purushothaman, Karnataka (IN)

(73) Assignee: Tata Consultancy Services Limited, Maharashtra (IN)

( * ) Notice: Subject to any disclaimer, the term of this patent is extended or adjusted under 35 U.S.C. 154(b) by 445 days.

(21) Appl. No.: 13/783,770

(22) Filed: Mar. 4, 2013

(65) Prior Publication Data
US 2013/0231795 A1 Sep. 5, 2013

(30) Foreign Application Priority Data
Mar. 2, 2012 (IN) .......................... 565/MUM/2012

(51) Int. Cl.
*G06F 1/26* (2006.01)
*G06F 17/18* (2006.01)
*G01D 4/00* (2006.01)

(52) U.S. Cl.
CPC ........ *G06F 1/26* (2013.01); *G01D 4/002* (2013.01); *G06F 17/18* (2013.01); *Y02B 90/241* (2013.01); *Y04S 20/32* (2013.01); *Y04S 20/38* (2013.01)

(58) Field of Classification Search
CPC ..... G01D 4/002; G06Q 50/06; G01R 22/063; G06K 9/6277; G06F 1/26; G06F 17/18; Y02B 90/241; Y04S 20/32; Y04S 20/38
USPC ......................................................... 700/295
See application file for complete search history.

(56) References Cited

U.S. PATENT DOCUMENTS

| | | | |
|---|---|---|---|
| 8,560,134 B1 * | 10/2013 | Lee ..................... | H02J 13/0086 700/28 |
| 2012/0066023 A1 * | 3/2012 | Xia et al. ..................... | 705/7.29 |
| 2012/0271472 A1 * | 10/2012 | Brunner et al. ............... | 700/295 |
| 2012/0278272 A1 * | 11/2012 | Kim et al. ....................... | 706/52 |

OTHER PUBLICATIONS

Zoha, et al, "Non-Intrusive Load Monitoring Approaches for Disaggregated Energy Sensing: A Survey", Sensors 2012, 12, pp. 16838-16866, Dec. 6, 2012.

(Continued)

*Primary Examiner* — Carlos Ortiz Rodriguez
*Assistant Examiner* — Jason Lin
(74) *Attorney, Agent, or Firm* — Hayes Soloway PC

(57) ABSTRACT

Disclosed is a method and system for optimizing a composite load disaggregation. The system comprises an input module, a factor graph module, a contextual information database, a rule engine, a priori database and a rule database. The factor-graph module is configured to perform factor-graph analysis on one or more input variables received from the input module to generate confidence measures wherein the confidence measures indicate the composite load disaggregation. The method and system is enabled to retrieve contextual information from the contextual information database. The method and system is further enabled to optimize the composite load disaggregation by means of the rule engine. The rule engine is adapted to retrieve one or more rules from the rule database and further adapted to apply retrieved rules to the confidence measures and to the contextual information for identifying at least one appliance from one or more appliances in an electrical environment.

15 Claims, 12 Drawing Sheets
(7 of 12 Drawing Sheet(s) Filed in Color)

(56) References Cited

OTHER PUBLICATIONS

Marceau, "Nonintrusive Load Disaggregation Computer Program to Estimate the Energy Consumption of Major End-uses in Residential Buildings", A Thesis in the Department of Building, Civil, and Environmental Engineering, May 1999, Montreal, Quebec, Canada.

Fitta, "Load Classification and Appliance Fingerprinting for Residential Load Monitoring System", Thesis, Aug. 13, 2010.

* cited by examiner

Actual vs Estimated Operation Schedule for Monitor (using both Real and Reactive Power)

Actual vs Estimated Operation Schedule for Lamp (using both Real and Reactive Power)

Actual vs Estimated Operation Schedule for Fan (using both Real and Reactive Power)

Actual vs Estimated Operation Schedule for Set-Top Box (using both Real and Reactive Power)

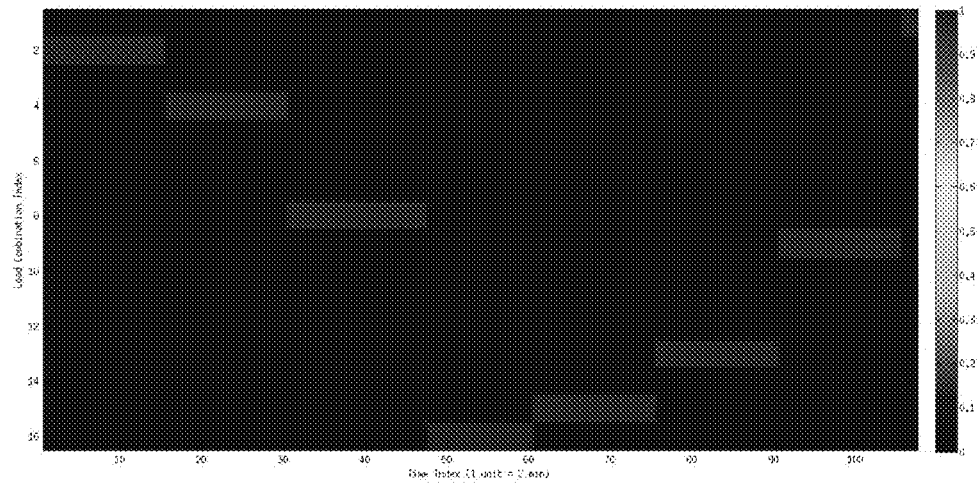
Figure 12 (Ideal Output)
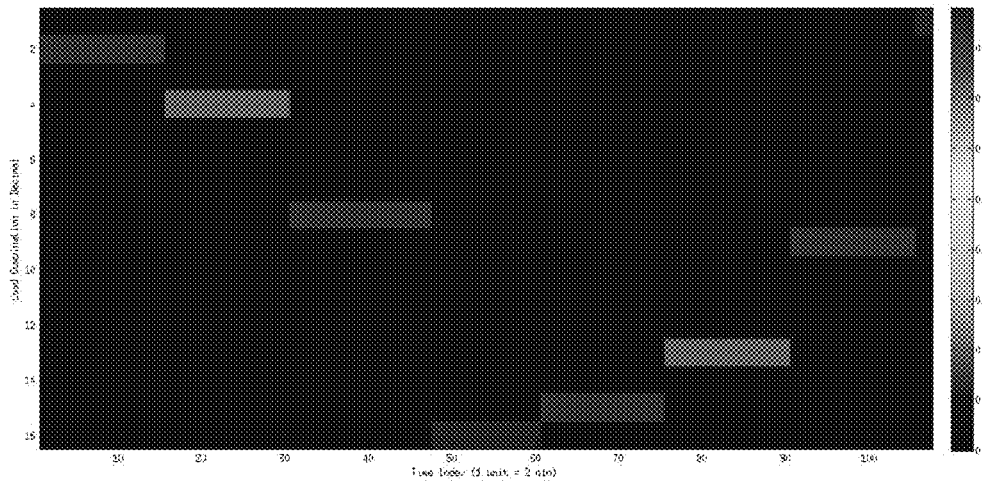
Figure 13 Actual Output

METHOD AND SYSTEM FOR OPTIMIZING A COMPOSITE LOAD DISAGGREGATION

TECHNICAL FIELD

The present subject matter described herein, in general, relates to composite electrical load and more particularly, it relates to composite load disaggregation.

BACKGROUND

Electricity is one of the most common and important commodities that is consumed by most of the households, industries, shopping-complexes and sports complexes etc. The demand for electricity is growing faster than any other form of energy in all parts of the world. This increasing need is making electricity generation the single largest and fastest rising contributor to carbon dioxide emissions. These trends clearly indicate the need for building technology solutions that reduces the electrical load consumed by number of electrical appliances. Further as the consumption of electricity is increasing gradually, it is essential to monitor and take precautionary measures to conserve the electrical energy for betterment of the future. Thus, measurement of energy consumed by different loads in any electrical environment is required.

In the present scenario, there are numerous techniques available in the art that enable measurement of energy consumption in a given premise. One of the techniques known in the art is measuring composite load using device such as a Smart Meter. The Smart Meter generally refers to a type of advanced electrical meter that identifies consumption of the power by the multiple electric loads in the environment collectively. The Smart Meter, when deployed at consumer location, is configured to sense the load consumed by one or more appliances used by the consumer to generate a consumer load profile in real-time. The consumer load profile is an aggregation of the load drawn by the various appliances at the consumer location. However, the Smart Meter typically generates a report depicting the information of the energy consumed by entire nodes or appliances collectively. Therefore the Smart Meter is not feasible to monitor and identify the energy consumed by a specific individual appliance. In general, the technique of identifying the individual appliance and the usage patterns of the identified appliance from a composite electrical load is referred to as electrical load disaggregation or composite load disaggregation.

In the background art, several techniques have been proposed implementing the composite load disaggregation. In one of the known technique in the art, the user or moderator has to manually switch ON/OFF each individual electrical appliance to get the signature of that appliance for disaggregation. In another technique, an intermediate monitoring device is inserted between the socket and the appliance to record its operation. This technique is generally called "intrusive" monitoring. In this technique, one has to acquire recording devices or sensors equivalent to the number of appliances installed in the customer premises. This method is considered as inconvenient and expensive for large-scale deployment as it requires use of separate measurement devices such as recording devices or transmitters or sensors to measure the electricity consumption. However, the use of multiple metering devices distributed throughout the building leads to overall increase in installation cost that invariably increases the complexity and is also cumbersome to handle.

Thus, in view of the above and several other drawbacks in the art, there is a need for a method and a system that enables the optimization of electrical load disaggregation by identifying the electrical individual appliances and their usage patterns in a non-intrusive manner and also alleviating several other drawbacks in the art.

SUMMARY

Before the present systems and methods, are described, it is to be understood that this application is not limited to the particular systems, and methodologies described, as there can be multiple possible embodiments which are not expressly illustrated in the present disclosures. It is also to be understood that the terminology used in the description is for the purpose of describing the particular versions or embodiments only, and is not intended to limit the scope of the present application. This summary is provided to introduce concepts related to systems and methods for optimizing a composite load disaggregation in an electrical environment and the concepts are further described below in the detailed description. This summary is not intended to identify essential features of the claimed subject matter nor is it intended for use in determining or limiting the scope of the claimed subject matter.

In one implementation, a system for optimizing the composite load disaggregation in the electrical environment is disclosed. The system comprises at least one processor and a memory coupled to the at least one processor for executing a plurality of modules present in the memory. The plurality of modules comprises an input module, a factor-graph module, a contextual information database and a rule engine. The input module is configured to receive one or more input variables. The one or more input variables further comprises one or more features and a set of priori data corresponding to one or more appliances. The one or more features are selected from a group of active/reactive power levels, power factors, harmonic distortions, transient signatures or combinations thereof. The set of priori data, on the other hand, indicates a probability of the at least one individual appliance from the one or more appliances being switched ON/OFF. In this implementation, the probability of the at least one appliance being switched ON/OFF is determined by analyzing a plurality of factors selected from a group comprising time of day, day of week, operational interdependencies among plurality of appliances, plurality of appliances of same type, family size, house size, dwelling type, geography, season, weather conditions, individual appliance rating or combinations thereof. The factor-graph module is configured to perform a factor-graph analysis on the one or more input variables. The factor-graph module is further configured to generate confidence measures for the one or more appliances in the electrical environment that indicates the composite load disaggregation. In this implementation, the confidence measures are generated by processing the one or more input variables using at least one message passing algorithm selected from a group comprising a sum-product algorithm, a max-sum algorithm or combinations thereof by using the factor-graph module. The system further comprises the contextual information database for storing the contextual information impacting the usage of the one or more appliances. In this implementation, the contextual information database is configured to store time of the day, weather conditions, geography, and operational interdependencies among plurality of appliances or combinations thereof. The system further comprises the rule engine for optimizing the composite load disaggregation by applying one or more rules to the confidence measures and to the contextual information for identifying at least one appliance from the one or more appliances.

In one implementation, a method for optimizing a composite load disaggregation in an electrical environment is disclosed. The method is enabled to perform a factor-graph analysis on one or more input variables to generate confidence measures for one or more appliances in the electrical environment. The confidence measures indicate the composite load disaggregation. The method is further enabled to retrieve contextual information impacting the usage of the one or more appliances from a contextual information database. The method is further enabled to optimize the composite load disaggregation by applying one or more rules to the confidence measures and to the contextual information for identifying at least one appliance from the one or more appliances. The implementation of, the performing, the retrieving, the optimizing are performed by at least one processor.

In one implementation, a computer program product having a computer program for optimizing a composite load disaggregation in an electrical environment is disclosed. The computer program product comprises a program code for performing a factor-graph analysis. The factor-graph analysis is performed on one or more input variables to generate confidence measures. The confidence measures indicate the composite load disaggregation. The computer program product further comprises a program code for retrieving contextual information impacting the usage of the one or more appliances. The computer program product comprises a program code for optimizing the composite load disaggregation by applying one or more rules to the confidence measures and to the contextual information for identifying at least one appliance from the one or more appliances.

BRIEF DESCRIPTION OF THE DRAWINGS

The foregoing summary, as well as the following detailed description of embodiments, is better understood when read in conjunction with the appended drawings. For the purpose of illustrating the invention, there is shown in the present document example constructions of the invention; however, the invention is not limited to the specific methods and apparatus disclosed in the document and the drawings:

The detailed description is described with reference to the accompanying figures. In the figures, the left-most digit(s) of a reference number identifies the figure in which the reference number first appears. The same numbers are used throughout the drawings to refer like features and components. The patent or application file contains at least one drawing executed in color. Copies of this patent or patent application publication with color drawing(s) will be provided by the Office upon request and payment of the necessary fee.

FIG. 12 and FIG. 13 respectively illustrates the ideal and the actual comparison output for the different load combinations, in accordance with an embodiment of the present subject matter.

Figure 1:
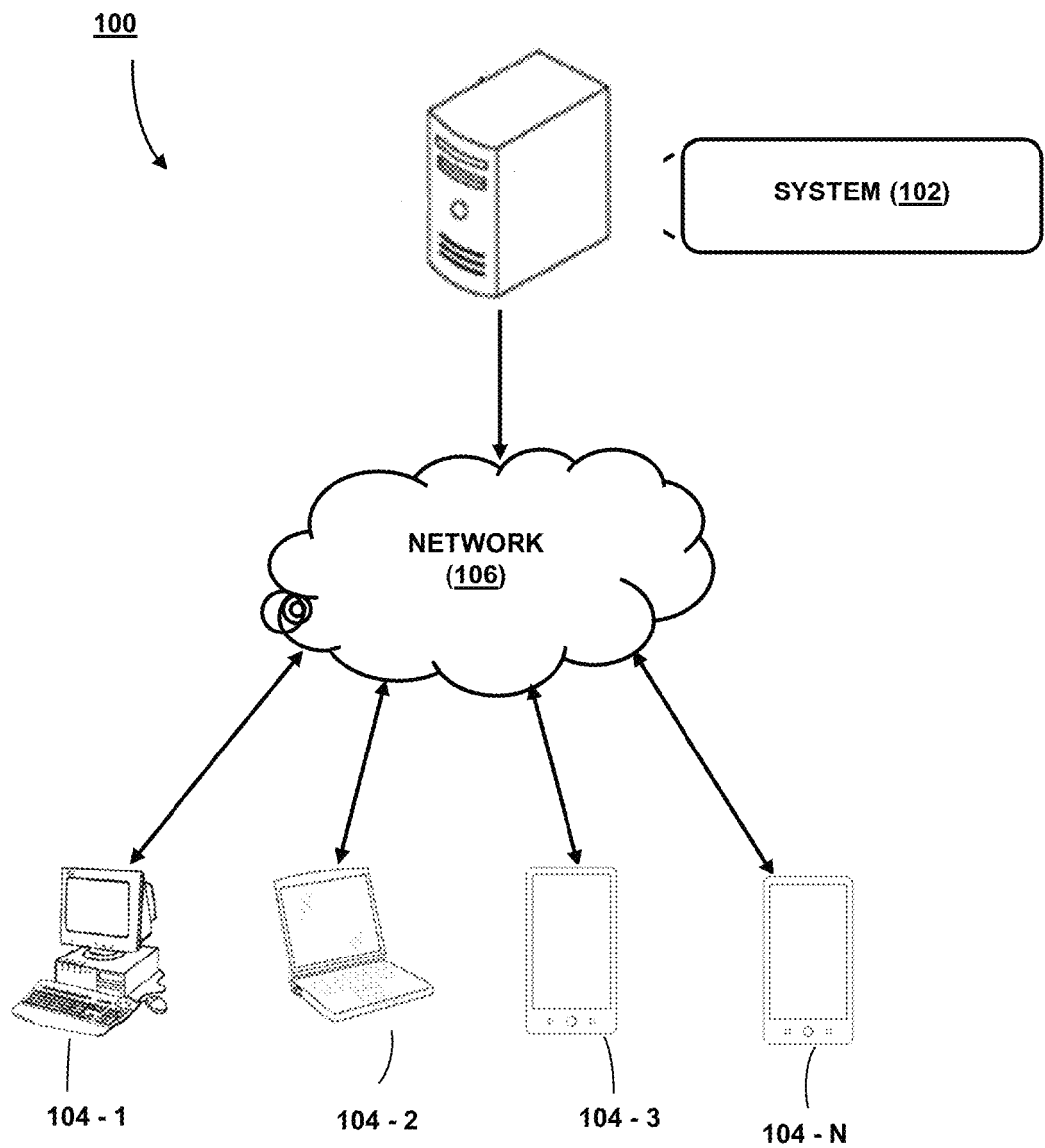
FIG. 1 illustrates a network implementation of a system for optimizing a composite load disaggregation in an electrical environment, in accordance with an embodiment of the present subject matter.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Some embodiments of this invention, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms and "the" include plural references unless the context clearly dictates otherwise. Although any systems and methods similar or equivalent to those described herein can be used in the practice or testing of embodiments of the present invention, the exemplary, systems and methods are now described. The disclosed embodiments are merely exemplary of the invention, which may be embodied in various forms.

Various modifications to the embodiment will be readily apparent to those skilled in the art and the generic principles herein may be applied to other embodiments. For example, although the present invention will be described in the context of a system and method for optimizing a composite load disaggregation in an electrical environment, one of ordinary skill in the art will readily recognize that the method and system can be utilized in any situation where there is need to optimize the composite load disaggregation by identifying at least one appliance from one or more appliances in the electrical environment. Thus, the present invention is not intended to be limited to the embodiments illustrated, but is to be accorded the widest scope consistent with the principles and features described herein.

Systems and methods for optimizing the composite load disaggregation in the electrical environment are described. The present subject matter discloses a mechanism to optimize the composite load disaggregation by identifying the at least one appliance from the one or more appliances in the electrical environment. The composite load disaggregation is carried out by performing a factor-graph analysis on one or more input variables. The one or more input variables are one or more features and a set of priori data corresponding to the one or more appliances. In one embodiment of the invention, the one or more features comprises of active/reactive power levels, power factors, harmonic distortions, transient signatures or combinations thereof whereas the set of priori data indicates a probability of the at least one appliance from the one or more appliances being switched ON/OFF. The set of priori data can be selected from a group comprising time of day, day of week, operational interdependencies among plurality of appliances, plurality of appliances of same type (same make and model), family size, house size, dwelling type (Apartment or detached house), geography, season, weather conditions, individual appliance rating or combinations thereof.

Based on the factor-graph analysis on the one or more input variables, the system of the present invention is enabled to generate confidence measures for the one or more appliances. The confidence measures is generated to indicate the composite load disaggregation by identifying the at least one appliance from the one or more appliances being switched ON at a particular instance. On identifying the at least one appliance switched ON, the system is further enabled to retrieve contextual information stored in a contextual information database. The contextual information is retrieved for analyzing the impact on the usage pattern of the one or more appliances. In one embodiment, the contextual information associated with the one or more appliances can be time of the day, weather conditions, geography, and operational interdependencies among the one or more appliances or combinations thereof.

As the contextual information is retrieved, the system is further enabled to optimize the composite load disaggregation. The optimization is performed by applying one or more rules on the confidence measures generated through the factor-graph analysis and the contextual information retrieved from the contextual information database. The one or more rules are applied to enhance the composite load disaggregation result for identifying at least one appliance from the one or more appliances carrying out the composite load disaggregation. The one or more rules are applied to resolve the conflicts while identifying the at least one appliance from the one or more appliances in the electrical environment.

While aspects of described system and method optimizing a composite load disaggregation in an electrical environment may be implemented in any number of different computing systems, environments, and/or configurations, the embodiments are described in the context of the following exemplary system. Thus, the following more detailed description of the embodiments of the invention, as represented in the figures and flowcharts, is not intended to limit the scope of the invention, as claimed, but is merely representative of certain examples of presently contemplated embodiments in accordance with the invention.

The presently described embodiments will be best understood by reference to the drawings, wherein like parts are designated by like numerals throughout. Moreover, flowchart and block diagrams in the Figures illustrate the architecture, functionality, and operation of possible implementations of systems and methods according to various embodiments of the present invention. In this regard, each block in the flowchart or block diagrams may represent a module, segment, or portion of code, which comprises one or more executable instructions for implementing the specified logical function(s).

Referring now to FIG. 1, a network implementation 100 of a system 102 for optimizing a composite load disaggregation in an electrical environment is illustrated, in accordance with an embodiment of the present subject matter. In one embodiment, the system 102 generates confidence measures for one or more appliances that indicate the composite load disaggregation. After determining the confidence measures, the system 102 further retrieves contextual information impacting the usage of the one or more appliances. Based upon the confidence measures and the contextual information, the system 102 optimizes the composite load disaggregation for identifying at least one appliance from the one or more appliances.

Although the present subject matter is explained considering that the system 102 is implemented as a server, it may be understood that the system 102 may also be implemented in a variety of computing systems, such as a laptop computer, a desktop computer, a notebook, a workstation, a mainframe computer, a network server, and the like. It will be understood that the system 102 may be accessed by multiple users through one or more user devices 104-1, 104-2, 104-3 . . . 104-N, collectively referred to as user 104 hereinafter, or applications residing on the user devices 104. It will be further understood that the system 102 may be installed on the user devices which are not connected to the server through a network 106. In such a scenario, the user devices 104 will act as a standalone system capable for optimizing the composite load disaggregation in the electrical environment. Examples of the user devices 104 may include, but are not limited to, a portable computer, a personal digital assistant, a handheld device, and a workstation. The user devices 104 are communicatively coupled to the system 102 through the network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
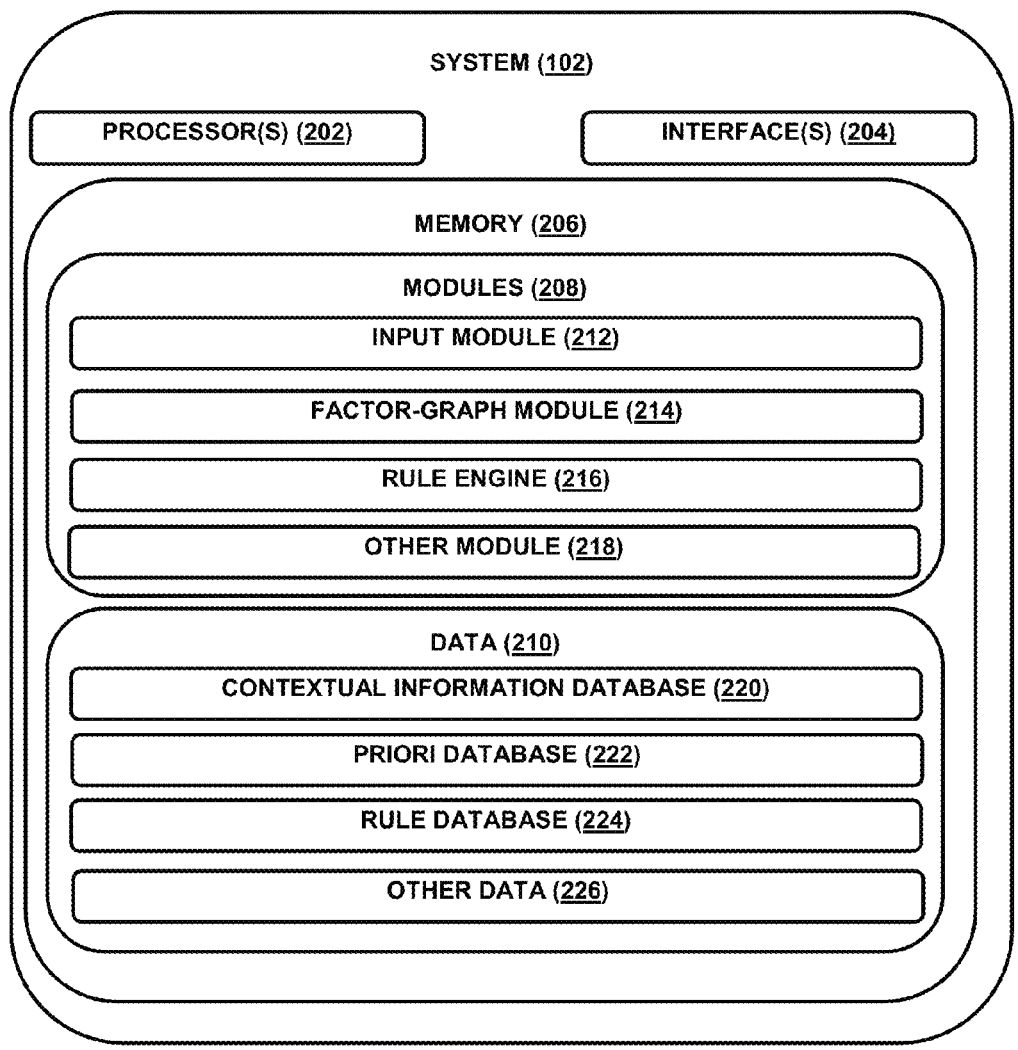
FIG. 2 illustrates the system, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with a user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or any computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include an input module 212, a factor-graph module 214, a rule engine 216, and other modules 218. The other modules 218 may include programs or coded instructions that supplement applications and functions of the system 102.

The data 210, amongst other things, serves as a repository for storing data processed, received, and generated by one or more of the modules 208. The data 210 may also include a contextual information database 220, a priori database 222, a rule database 224 and other data 226. The other data 226 may include data generated as a result of the execution of one or more modules in the other module 218.

In one implementation, at first, a user may use the client device 104 to access the system 102 via the I/O interface 204. The users may register themselves using the I/O interface 204 in order to use the system 102. The system 102 may be used for optimizing a composite load disaggregation in an electrical environment. In order to optimize the composite load disaggregation, the system 102, at first, receives one or more input variables. Specifically, in the present implementation, the one or more input variables are received by the input module 212.

The one or more input variables comprise one or more features corresponding to one or more appliances. The one or more features in the one or more appliances received by the input module 212, acquire electric current data from the main supply lines. There are numerous techniques are available in the art to analyze the electric current data acquired by the one or more appliances. However, in order to optimize a composite load disaggregation in the electrical environment, the present system and method implements various known techniques to derive the one or more features. In an embodiment of the invention, the one or more features can be extracted from the one or more appliances by using the existing techniques or modules that can implemented with the present system and method. The existing techniques or modules are a data acquisition module, an event detection module and a feature extraction module (not shown in the figure). The data acquisition module is configured to acquire the electric current data consumed by the one or more appliances from the main supply lines. In response to the data acquisition module, the event detection module facilitates segmentation of the electric current data. The event detection module is further enabled to observe a variable change in the electric current data which corresponds to switching ON/OFF of the one or more appliances over multiple time-scales. Based on the observation, the feature extraction module compares the electric current data acquired through the data acquisition module and the variable change observed by the event detection module to extract the one or more features from each segment of the electric current data created by the event detection module. In one embodiment, the one or more extracted features comprises of active/reactive power levels, power factors, harmonic distortions, transient signatures or combinations thereof associated with the one or more appliances. The one or more features are then received by the input module 212 as one of the input variables.

The one or more input variables further comprise a set of priori data as other input variable that corresponds to one or more appliances. The set of priori data indicates a probability of at least one appliance from the one or more appliances being switched ON/OFF at a particular instance. In one embodiment, the probability of the at least one appliance being switched ON/OFF is determined by analyzing a plurality of factors stored in the priori database 222. The plurality of factors can be selected from a group comprising of time of day, day of week, operational interdependencies among plurality of appliances, family size, house size, dwelling type (Apartment or detached house), geography, season, weather conditions, individual appliance rating. The group further comprises a plurality of appliances of same type (same make and model), for example if an apartment having 3 televisions, 2 air-conditioners, 5 CFL lamps and 4 fans of same make and same model. In such scenario, the priori data stored in the priori database 222 for that particular apartment having the one or more appliances are (3, 2, 5, and 4) for television, air-conditioner, Air-conditioner and fan respectively. The priori data in such scenario assists in the composite load disaggregation. The set of priori data is then received by the input module 212 as one of the input variables. In another embodiment of the invention, the input variables including the one or more features and the set of priori data are received from the user through the input module 212.

In an embodiment, the input variables received can be from one appliance alone, two or more appliances collectively. In another embodiment, the system is adapted to classify the appliances in a hierarchy of loads; each hierarchy representing appliance belonging to a specific category such as appliances in a particular room, appliances in a flat, appliances in a building or appliances in a premises etc. In such a case, the multiple individual appliances categorized in a particular category can be represented as a virtual load. In such scenario, the input variables comprising features and priori data correspond to multiple appliances in the virtual load.

In one embodiment, the one or more input variables are obtained from one of either an intrusive load monitoring method, or a non-intrusive load monitoring method, or a hybrid method including combination of intrusive and non-intrusive methods. The intrusive methods include monitoring using sensors, smart meters and other devices or combinations thereof. The non-intrusive methods include sensing the input variables by means of machine learning techniques, artificial intelligence or combinations thereof.

Based on the input variables, the factor-graph module 214 is configured to perform a factor-graph analysis on the one or more input variables received from the input module 212. The objective of implementing the factor-graph module 214 in the system 102 is to perform factor-graph analysis for observing the variable change in the electric current data, wherein the variable change in the data corresponds to switching ON/OFF of the one or more appliances. The factor-graph analysis is further performed to generate confidence measures for one or more appliances in the electrical environment. The confidence measures is indicative of the at least one appliance from the one or more appliances being switched ON at the particular instance. In order to obtain the confidence measures, the factor-graph module 214 performs the factor-graph analysis on the input variables in the following manner:

In one embodiment, consider the one or more appliances having feature vectors $f_1, f_2, \ldots, f_N$. Consider the feature vectors $f_1, f_2, \ldots, f_N$ results in the composite feature Y. In this embodiment, the disaggregation result corresponds to estimating the source signal vector X=[X$_1$ X$_2$ ..., X$_N$]. In a simplistic case, X$_i$ takes the value '1' or '0' wherein '1' corresponds to the appliance with the feature vector f$_i$ is ON and '0' corresponds to the appliance with the feature vector f$_i$ is OFF. In this embodiment, the disaggregation estimation is considered to be a disaggregation problem and correlated to the maximum a posteriori (MAP) probability problem as below:

$$\hat{x}_i = \arg\max_{x_i} p(x_i | Y)$$

In one embodiment, the disaggregation estimation can be obtained by marginalizing the distribution describing the disaggregation problem and thus involving all input variables. The input variables represents the feature vectors f$_1$, f$_2$, ..., f$_N$ and the priori data associated thereof. This marginalization can be obtained by passing the "local" messages using the sum-product algorithm. In another embodiment, marginalization can be obtained by passing the "local" messages using the max-sum algorithm. The messages are passed iteratively to arrive at the requisite solution. Further the message-passing algorithm is iteratively implemented on the factor graph by specifying a stopping criterion. The steps implemented for this algorithm are as follows:
1. Initialize Messages
2. Run the message passing algorithm according to the schedule until a predefined number of iterations or until some other stop criterion is reached.

After stopping the message-passing, the marginal of a variable can be obtained by using the product of the messages (in either direction) on the corresponding edge as below equation:

$$\hat{x}_i = \arg\max_{x_i} \underbrace{\underbrace{\sum_{\sim x_i} \underbrace{p(\text{"all variables"})}_{\text{Factor Graph}}}_{\text{Sum (written as product)}}}_{\text{Sum-Product Algorithm}}$$

where, ~x$_i$ stands for all variables except x$_i$.

The factor-graph analysis is a graphical representation of a mathematical model wherein edges of the said graph correspond to the variables and the nodes represent the relationship between the variables. Based on the above factor-graph analysis, on the input variables, the factor-graph module 214 is configured to derive the confidence measures, wherein the confidence measures indicate the composite load disaggregation.

After deriving the confidence measures indicating the composite load disaggregation, the system 102 is further enabled to retrieve contextual information from the contextual information database 220. The contextual information database 220 is predefined set of information impacting the usage pattern of the one or more appliances. In one embodiment, the contextual information comprises time of the day, weather conditions, geography, and operational interdependencies among plurality of appliances or combinations thereof.

Based on the confidence measures and the contextual information, the system 102 is further enabled optimize the composite load disaggregation for identifying the at least one appliance from the one or more appliances in the electrical environment consuming the electric current data from the main supply lines. The process of optimization is performed by using the rule engine 216. The rule engine 216 is adapted to extract one or more rules from the rule database 224. As the one or more rules are extracted, the rule engine 216 is further adapted to apply one or more rules on the confidence measures and the contextual information for identifying at least one appliance from the one or more appliances. Therefore the rule engine 216 optimizes the composite load disaggregation and thereby resolving the conflicts in decision by acting on the results output through the factor-graph analysis. In an exemplary embodiment, when too many appliances get high confidence measures and their combined power exceeds the observed power by a huge value; in such case, the system 102 analyze the load combination which is closest to the observed power and declares those loads as the currently operating ones by means of applying rules using the rule engine 216. In one embodiment, the rule engine 216 check for certain conditions to be satisfied by the one or more appliances being identified in ON state. For example, the specific conditions can be power consumption of identified load combination, time of operation, time duration of operation etc. Due to the inherent nature of the algorithm (i.e. use of marginalization), loads which are not actually ON might get good confidence measures. To avoid such cases, the system 102 is configured to compute the difference between the actual power and the power consumed by a combination of the one or more appliances having high confidence measures. The rule for this scenario is to choose the combination that provides the minimum difference and lesser than a predetermined threshold. The remaining combinations are discarded. In an exemplary embodiment, considering P$_L$ as the power of the load combination L=[L$_1$ L$_2$ ..., L$_k$] where k being the number of loads with high confidence measures and P$_0$ as the observed power from the smart meter, the typical rule for this exemplary embodiment can be written as:

```
for i = 1:2^k
    D(i) = |P0 - P_Li|
end
find minimum of D = D_min
If D_min < Θ
    (where Θ is a predefined threshold and D_min corresponds to the load
    combination L_m)
then L_m is the load combination.
```

Another rule-based inference is to correlate the one or more appliances with moderate confidence measures (for example, 60%) with the time of operation (time of disaggregation). If the one or more appliances are ON at a time where its operation is almost impossible to find or if the ON duration is considerably small or large when compared with standard ON-time, the system 102 rule out those appliances. Similarly, another rule can be configured by the rule engine 216 to exploit the interdependency on the operation of appliances. For example, if washer is detected with high confidence measure (almost certainly) and if a dryer is inferred from the factor graph with a moderate confidence measure at a subsequent disaggregation instant, then the decision can be made in favor of the dryer. A specific rule that can be written for this scenario will be:

```
if dryer is ON at t_l
    and if confidence measures of dryer at t_1 + δ is moderate (where δ is
    very small)
    then dryer is ON at t_1 + δ
```

After the composite load disaggregation is optimized, the I/O interface 204 may be adapted to display the composite load disaggregation to the user. The I/O interface 204 may also present an option to update, export the composite load disaggregation result to external entities such as, a portable computer, a personal digital assistant or a handheld device for monitoring the composite load disaggregation of the one or more appliances in the electrical environment.

In one embodiment, the system 102 is located within the electrical environment. In this implementation, the system 102 can be either accessed by a server on which the system 102 is installed or accessed by the user devices 104 for optimizing the composite load disaggregation. In another embodiment of the invention, the system 102 is located outside the electrical environment that can be accessed by the user devices 104-1, 104-2, 104-3, 104-n. In this implementation, the user devices 104 are able to identify the at least one appliance from the one or more appliances in their respective electrical environment. The user devices 104 accesses the system 102 located at the remote location through network (106) for optimizing the composite load disaggregation.

Advantages of the System

The present invention addresses the problem of load disaggregation in a non-intrusive manner by identifying the individual appliances and their usage patterns from a composite load.

The present invention further recognizes the individual appliances from the composite load measured at few meters or convenient points that enhances the value of electricity by knowing more on how it is used.

The present invention further provides a single point measurement of disaggregating the composite load.

The present invention further provides a cost effective manner for disaggregating the composite load without integrating any additional hardware in the system.

Figure 3:
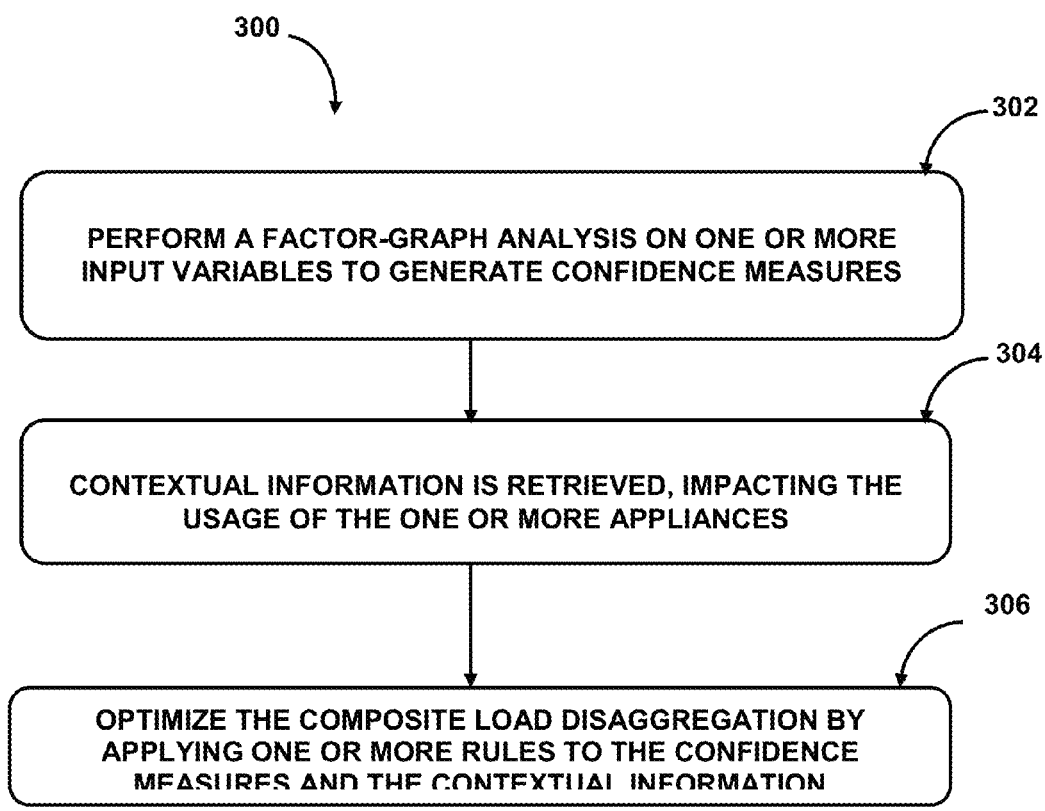
FIG. 3 illustrates a method for optimizing a composite load disaggregation in an electrical environment, in accordance with an embodiment of the present subject matter.

Referring now to FIG. 3, a method 300 for optimizing a composite load disaggregation in an electrical environment is shown, in accordance with an embodiment of the present subject matter. The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method can be implemented in any suitable hardware, software, firmware, or combination thereof. However, for ease of explanation, in the embodiments described below, the method 300 may be considered to be implemented in the above described system 102.

At block 302, a factor-graph analysis is performed on one or more input variables (i.e. one or more features and a set of priori data) to generate confidence measures for one or more appliances wherein the confidence measures indicate the composite load disaggregation. Further, the block 302 may be explained in greater detail in FIG. 4.

At block 304, contextual information is retrieved that impacts the usage pattern of the one or more appliances. In one implementation, the contextual information is retrieved from the contextual information database 220.

At block 306, the composite load disaggregation is optimized by applying one or more rules to the confidence measures and the contextual information for identifying at least one appliance from the one or more appliances, wherein the one or more rules are applied by the rule engine 216. In one implementation, the one or more rules are retrieved from the rule database 224.

Figure 4:
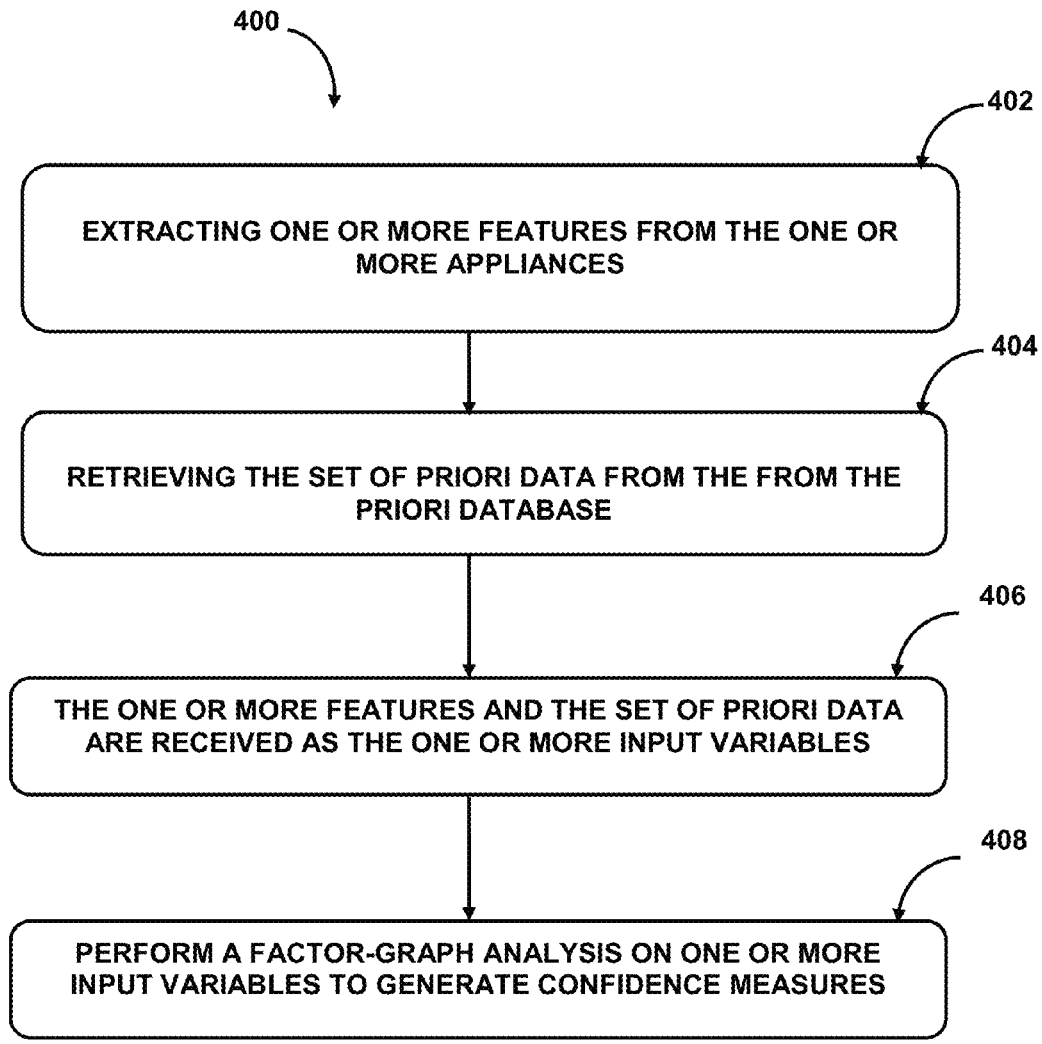
FIG. 4 illustrates a method for generating confidence measures to perform factor-graph analysis, in accordance with an embodiment of the present subject matter.

Referring now to FIG. 4, a method 302 for generating the confidence measures is shown, in accordance with an embodiment of the present subject matter.

At block 402, the one or more features are extracted from the one or more appliances. The one or more features are extracted using existing techniques such as data acquisition module, event detection module and feature extraction module.

At block 404, the set of priori data is retrieved from the priori database 222. In one implementation, the set of priori data indicates a probability of the least one appliance from the one or more appliances being switched ON/OFF.

At block 406, the one or more features and the set of priori data are received as the one or more input variables by the input module 212.

At block 408, the factor-graph analysis is performed on the one or more input variables to derive the confidence measures that indicates the composite load disaggregation. In one implementation, the factor-graph analysis is performed by the factor-graph module 214.

Figure 5:
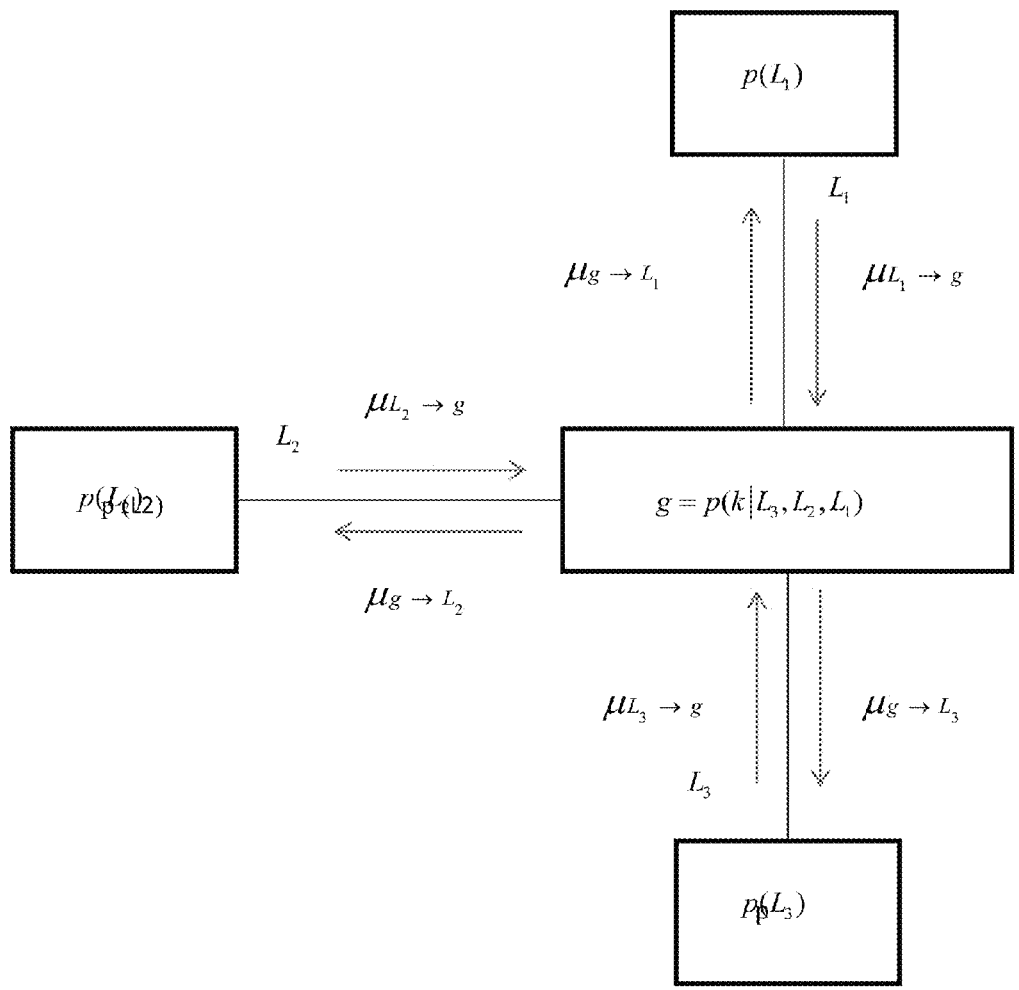
FIG. 5 is an example of factor-graph analysis performed on one or more input variables, in accordance with an embodiment of the present subject matter.

Referring now to FIG. 5 is an example of factor-graph analysis performed on one or more input variables, in accordance with an embodiment of the present subject matter. According to method of the present invention, various embodiments are possible enabling electrical load disaggregation using factor-graph based analysis. In one of the embodiment, the method involves determining a joint probability distribution function (PDF) of the feature vectors with all possible combinations of the loads. This function is used to maximize the a posteriori distribution. In this embodiment a model is implemented that determines a likelihood function for each feature vector given all possible load combinations, and utilize these functions to characterize the joint a posteriori PDF.

In this embodiment, consider an electric application with three different loads Lamp, Television and Refrigerator respectively. The power consumed by each load can be very easily observed using a power meter, as a feature. In other words, in this case, the feature vector is a one dimensional vector. Following are the typical power consumptions of the loads under consideration.

Power rating of Lamp ($L_1$)—around 32 W
Power rating of Television ($L_2$)—around 72 W
Power rating of Refrigerator ($L_3$)—around 108 W Now, the load disaggregation problem can be cast as a maximum a posteriori (MAP) problem. It can be observed that it is sufficient to obtain the joint PDF of the feature and the loads in order to solve the maximum a posteriori (MAP) problem. In this embodiment, the joint probability distribution function is factorized into the likelihood function and a priori probabilities as follows:

$$p(K,L_3,L_2,L_1)=p(K|L_3,L_2,L_1)p(L_3,L_2,L_1)$$

where 'K' denotes the feature value. The loads are assumed to be independent of each other. Thus, $$p(K,L_3,L_2,L_1)=p(K|L_3,L_2,L_1)p(L_3)p(L_2)p(L_1) \quad (1)$$

The initial step is to obtain the requisite factor graph. The normal factor graph corresponding to above equation (1) is illustrated in FIG. 5. The next step is to specify the variable and message types.

Variables:

$L_i$: represents the source signal of load i. The signal is modeled to be binary; where value '0' indicates that the i th load is OFF and '1' indicates that the i th load is ON.

K: represents the index of the feature vector. In this embodiment, one dimensional feature vector considered with its value as the observed power.

Further, the feature value (power in this case) is considered as a discrete variable and maps it to an appropriate index.

Messages:

$\mu_{Li \to g}$: represents the message passed from edge variable $L_i$ to the function g. This message is a function of the variable $L_i$; thus, it can be represented as a two dimensional vector. This message is computed as the product of all the incoming messages excluding the message from factor g to node $L_i$.

$\mu_{g \to Li}$: represents the message passed from g to the edge variable $L_i$. This message is also a function of the variable $L_i$; thus, it can be represented as a two dimensional vector. This message is calculated using the sum-product rule which is described by referring equation (2)

At the power measurement level, ideally the output 'K=P' can vary between Pmin, i.e. 0 Watts (when all loads are OFF) to sum of power ratings of all three loads, Pmax (when all loads are ON). Output P can take only a set of values between Pmin to Pmax, i.e. different combinations of the three loads. A set of range for the output readings are defined.

Further, in accordance with this embodiment, the likelihood functions $p(K|L_3, L_2, L_1)$ are modeled. The following table lists the different combinational values of feature indices 'K' and probability of different load combinations falling into different ranges of P.

| Feature Index(k) | Range for 'P' | L = 0 T = 0 R = 0 | L = 0 T = 0 R = 1 | L = 0 T = 1 R = 0 | L = 0 T = 1 R = 1 | L = 1 T = 0 R = 0 | L = 1 T = 0 R = 1 | L = 1 T = 1 R = 0 | L = 1 T = 1 R = 1 |
|---|---|---|---|---|---|---|---|---|---|
| 0 | 0-5 | 0.95 | 0.05 | 0 | 0 | 0 | 0 | 0 | 0 |
| 1 | 20-40 | 0.05 | 0.9 | 0.05 | 0 | 0 | 0 | 0 | 0 |
| 2 | 60-80 | 0 | 0.05 | 0.9 | 0.05 | 0.1 | 0 | 0 | 0 |
| 3 | 100-120 | 0 | 0 | 0.05 | 0.9 | 0.8 | 0.1 | 0 | 0 |
| 4 | 170-190 | 0 | 0 | 0 | 0 | 0 | 0.1 | 0.8 | 0.1 |
| 5 | 130-150 | 0 | 0 | 0 | 0.05 | 0.1 | 0.8 | 0.1 | 0 |
| 6 | 200-220 | 0 | 0 | 0 | 0 | 0 | 0 | 0.1 | 0.9 |

Consider the a priori probabilities of operation of loads as follows:

$$p(\text{Lamp=ON})=p(L_1=1)=0.5$$

$$p(\text{Television=ON})=p(L_2=1)=0.25$$

$$p(\text{Refrigerator=ON})=p(L_3=1)=0.75$$

In one embodiment, if the output measured "P" is found to be 108 W, the observed power falls under index-3, i.e. k=3. Note that k denotes the index of the feature range corresponding to the observed value of random variable K, which in this particular case is 3. Further, the value of the feature is fixed and thus it does not enter in the factor graph.

The objective to determine the probability of a load being switched ON to contribute to the output power P, i.e., $p(L_1|k)$, $p(L_2|k)$ and $p(L_3|k)$. As disclosed earlier, $p(k, L_1, L_2, L_3)$ represents the joint probability distribution of different loads present with observed feature index k=3. The function $p(k, L_1, L_2, L_3)$ can be factorized as, $$p(k,L_1,L_2,L_3)=p(k|L_1,L_2,L_3)p(L_1)p(L_2)p(L_3)$$

The graphical representation of the above expression is depicted in FIG. 5. The function nodes compute the messages using the sum-product rule. Particularly, the message $\mu_{g \to Li}$, is computed using the following equation:

$$\mu_{g \to Li(Li)} = \sum_{\sim\{Li\}} p(k|L_1, L_2, L_3) \quad (2)$$

i.e. $\mu_{g \to L_1}(L_1) = \sum_{\sim\{L_1\}} p(k|L_1, L_2, L_3)\mu_{L_2 \to g}\mu_{L_3 \to g}$ $\mu_{g \to L_2}(L_2) = \sum_{\sim\{L_2\}} p(k|L_1, L_2, L_3)\mu_{L_2 \to g}\mu_{L_3 \to g}$ $\mu_{g \to L_3}(L_3) = \sum_{\sim\{L_3\}} p(k|L_1, L_2, L_3)\mu_{L_1 \to g}\mu_{L_1 \to g}$ Finally $p(Li|k)=\mu_{g \to Li}(Li)*\mu_{Li \to g}$ is calculated for each load and confidence levels are identified.

For Load-1, i.e. Lamp $$\mu_{g \to L_1}(L_1) = \sum_{\sim\{L_1\}} p(k|L_1, L_2, L_3)\mu_{L_2 \to g}\mu_{L_3 \to g}$$

On substituting the values, $$p(L_1|k) = \begin{cases} 0.8011 & L_1 = 0 \\ 0.1989 & L_1 = 1 \end{cases}$$

For Load-2, i.e. Television $$\mu_{g \to L_2}(L_2) = \sum_{\sim\{L_2\}} p(k|L_1, L_2, L_3)\mu_{L_2 \to g}\mu_{L_3 \to g}$$

On substituting the values, $$p(L_2|k) = \begin{cases} 0.895 & L_2 = 0 \\ 0.105 & L_2 = 1 \end{cases}$$

For Load-3, i.e. Refrigerator $$\mu_{g \to L_3}(L_3) = \sum_{-\{L_3\}} p(k \mid L_1, L_2, L_3) \mu_{L_1 \to g} \mu_{L_1 \to g}$$

On substituting the values, $$p(L3 \mid k) = \begin{cases} 0.105 & L3 = 0 \\ 0.895 & L3 = 1 \end{cases}$$

Observing the probabilities, it can be inferred that the refrigerator is ON whereas the Lamp and the TV are OFF. The probability values give the measure of confidence to make the inference. It is possible to absorb other information like time of day and its effect on the a priori probabilities in hierarchical fashion by a factor graph technique called as opening of the source node. It is possible to accommodate dependencies between the various loads by modeling the appropriate conditional probability functions. For example, when TV is ON, the probability of lamp being ON is increases. Note that such modeling would result in better estimates, however, it introduces cycles in the factor graph.

Figure 6:
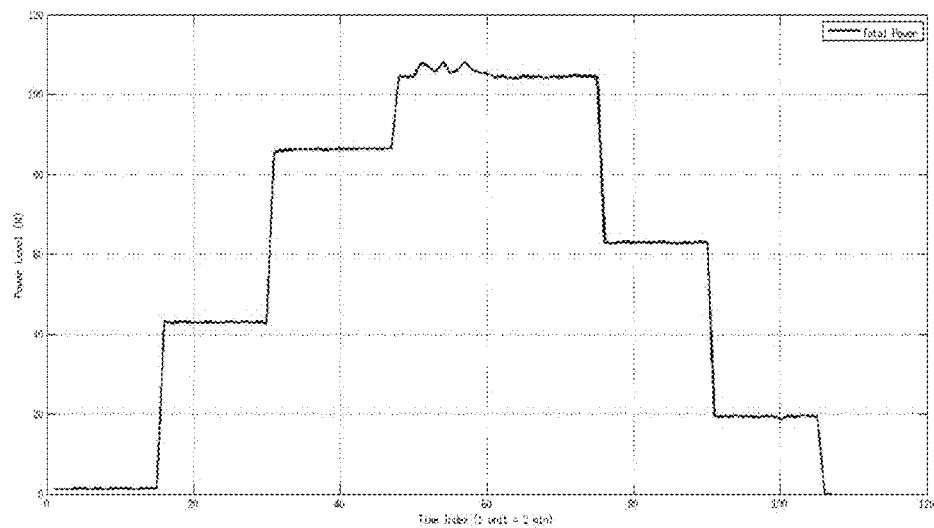
FIG. 6 and FIG. 7 respectively illustrates an example of composite load disaggregation using feature variables of real power and reactive power, in accordance with an embodiment of the present subject matter.
Figure 7:
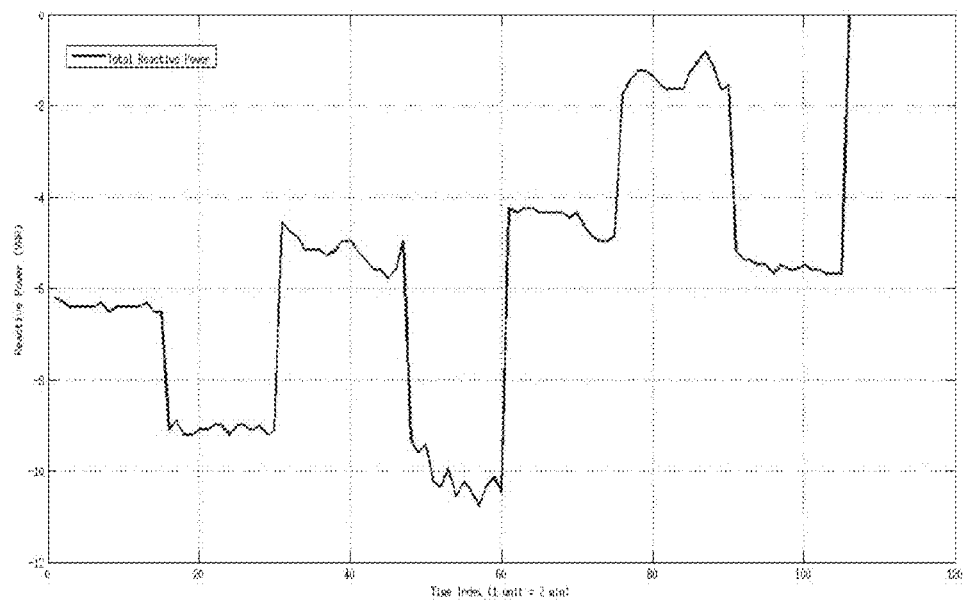
Figure 8:
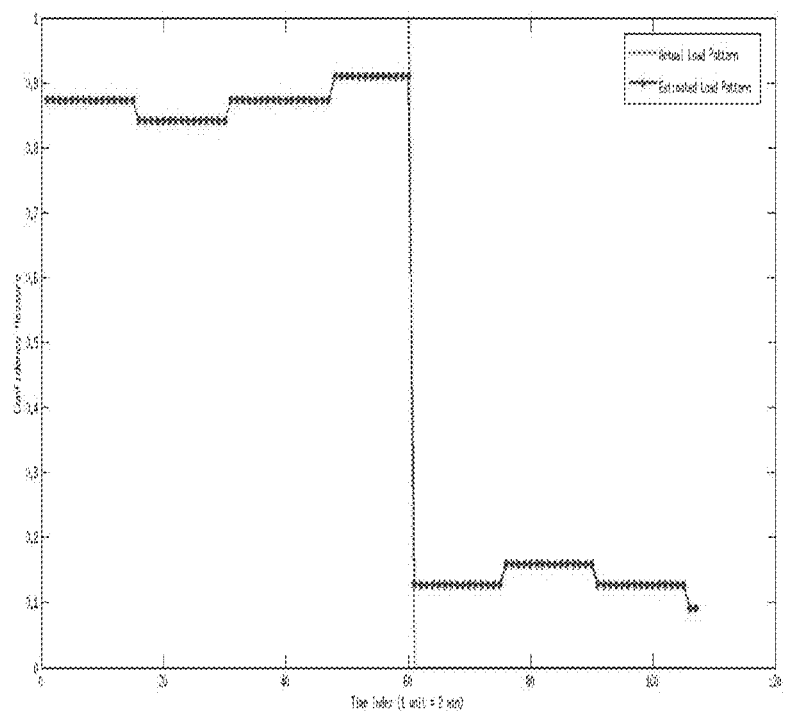
FIG. 8, FIG. 9, FIG. 10 and FIG. 11 respectively illustrates the comparison of Actual and Estimated Operation Schedule for Monitor, Lamp, Fan and Set-Top Box, in accordance with an embodiment of the present subject matter.
Figure 9:
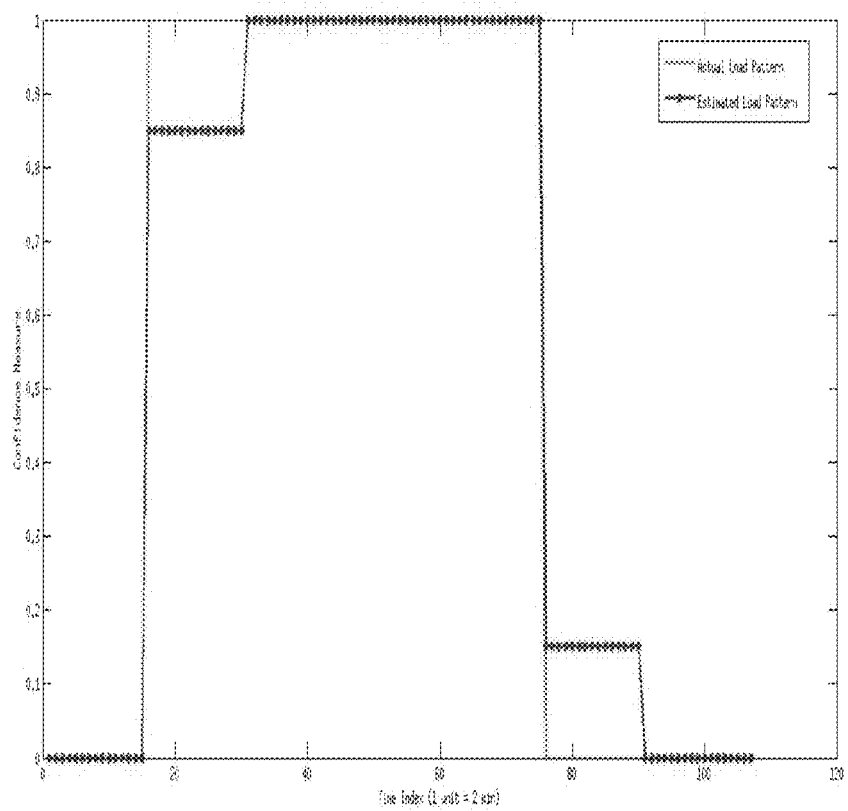
Figure 10:
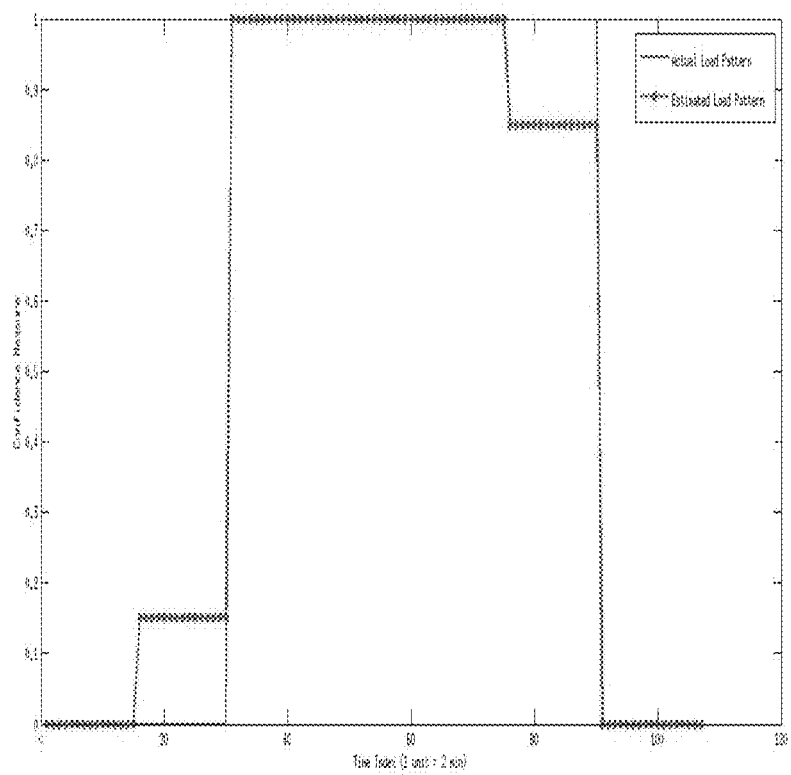
Figure 11:
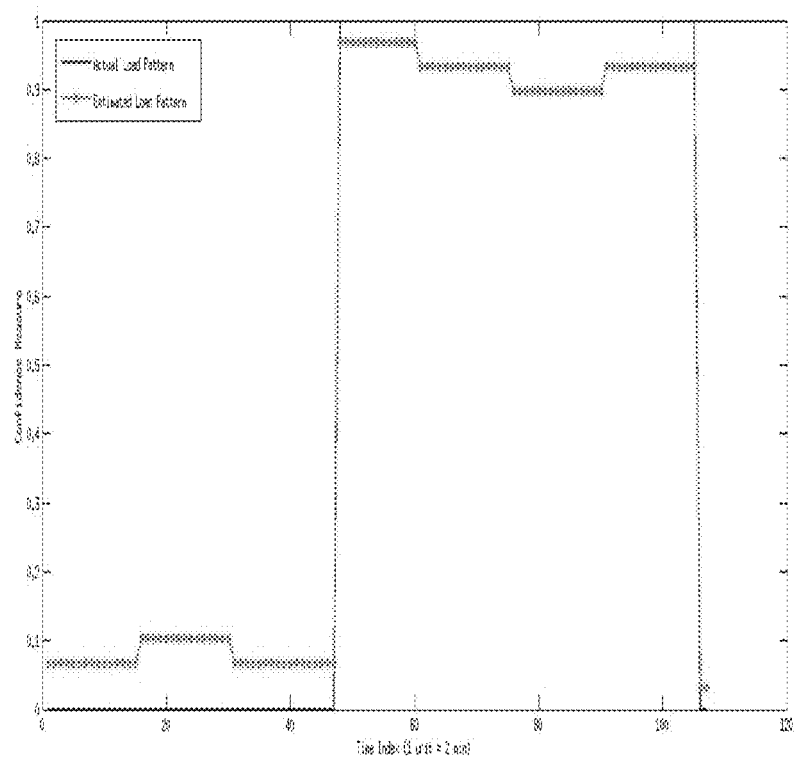

In one exemplary embodiment, the composite load disaggregation is implemented and tested through a part of the Home Energy Management Solution (HEMS) experimental set up at our Lab. The set up can provide the (i) real power in watts (ii) kWh consumed (iii) frequency (iv) RMS voltage (v) RMS current (vi) reactive power (vii) VARh consumed and the (viii) phase angle at a sampling rate of one sample of each measure and at every 5 min. In this embodiment, the experiment is carried by connecting 4 appliances (monitor, lamp, table fan and the Set-top box) to the set up as indicated in Table 1. In the composite load disaggregation analysis, two measurements in the form of feature variables comprising of active power and reactive power are considered. The measured values in a typical scenario are shown in FIG. 6 and FIG. 7.

TABLE 1

| Device Name | Real Power Rating (W) | Reactive Power Rating (VAR) |
|---|---|---|
| Monitor | 1.24 | −6.52 |
| Lamp | 41.8 | −2.58 |
| Table Fan | 42.6 | 4.55 |
| Set-top Box | 18.6 | −4.76 |

The confidence measures for the operation schedule of the appliances as mentioned in the Table 1, i.e. the monitor, lamp, table fan and the Set-top box obtained by executing the sum-product algorithm are depicted in FIG. 8, FIG. 9, FIG. 10 and FIG. 11. The sum-product algorithm is executed by considering the two feature variables namely, real power and reactive power. Further, in this embodiment, priori probabilities for the switch being set ON of each appliance are considered equal. The likelihood of every load combination can be obtained by first computing the one-norm between the measurement and the feature vector corresponding to the load combination. The latter can be easily calculated under the assumption that the ratings (for instance, in terms of real and reactive powers) are known. Then the reciprocal of this one-norm is calculated and the values are further normalized to arrive at the requisite likelihoods. The performance curves bring out the efficacy of the scheme in disaggregating the loads with good confidence scores and accuracy, when the appliance ratings are given and they are separated neatly in the feature space.

In this embodiment, the factor graph based max-sum message passing is implemented, wherein the posteriori probabilities of the different load combinations (as depicted in Table 2) are obtained as actual results as illustrated in FIG. 13. FIG. 12 illustrates the ideal output for comparison.

TABLE 2

| | Set-top-box | Fan | Lamp | Monitor |
|---|---|---|---|---|
| 1 | 0 | 0 | 0 | 0 |
| 2 | 0 | 0 | 0 | 1 |
| 3 | 0 | 0 | 1 | 0 |
| 4 | 0 | 0 | 1 | 1 |
| 5 | 0 | 1 | 0 | 0 |
| 6 | 0 | 1 | 0 | 1 |
| 7 | 0 | 1 | 1 | 0 |
| 8 | 0 | 1 | 1 | 1 |
| 9 | 1 | 0 | 0 | 0 |
| 10 | 1 | 0 | 0 | 1 |
| 11 | 1 | 0 | 1 | 0 |
| 12 | 1 | 0 | 1 | 1 |
| 13 | 1 | 1 | 0 | 0 |
| 14 | 1 | 1 | 0 | 1 |
| 15 | 1 | 1 | 1 | 0 |
| 16 | 1 | 1 | 1 | 1 |

Apart from the experimental data as above, rigorous simulation techniques are also carried out with more number of appliances and unequal priori probabilities for appliance operations. It is observed that, by considering the actual priori probabilities, the accuracy of the results is improved. In an embodiment, a hybrid measurement scenario can also be considered, wherein apart from measurement at smart meter point, additional plug-level data is also available for few appliances that lead to better results as compared to the single-point measurement. There are different ways of handling this additional information, like subtracting the consumption of appliances (whose plug data is available) from the meter measurement for the considered disaggregation instant or modifying the priori probabilities based on the additional information, and so on.

Figure 14:
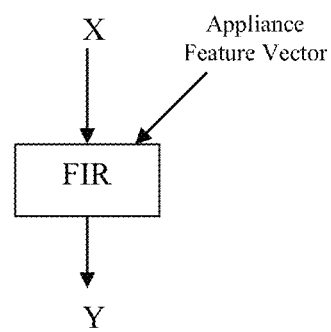
FIG. 14 is a block diagram illustrating formulation of factor-graph based on individual feature load diagram in accordance with an embodiment of the present subject matter.
Figure 15:
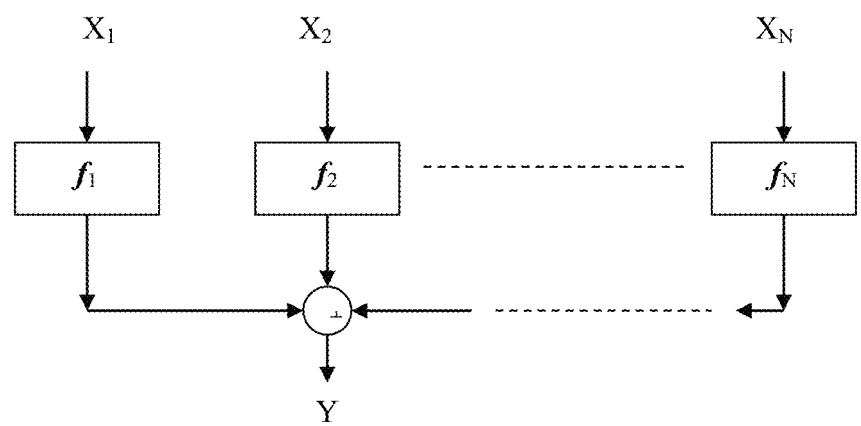
FIG. 15 is a block diagram illustrating the composite Feature formed as a result of individual features in accordance with an embodiment of the present subject matter.

In an embodiment, a factor graph formulation is implemented based on load block diagram The factor graph implementation for load disaggregation based on the block diagram which depicts how the composite feature vector (set of features) is generated from the superposition of individual signature feature vector of appliances. Each of the appliance signature feature vectors can be treated as a complex impulse response of Finite Impulse Response (FIR) filter. As observed in FIG. 5, the said filter is excited by a source X which can take the values '1' or '0' depending on whether the appliance is switched ON or OFF. The outputs of these filters get superposed to result in the composite feature vector as illustrated in FIG. 14 and FIG. 15. In this embodiment, the feature vectors of individual appliances add additively in producing the composite feature vector.

From the block diagram, the related factor graph can be deduced that consists of various nodes like source nodes, feature nodes and sum constraint nodes. These nodes need to be defined in detail in terms of their functionalities. The functionalities of nodes can involve either probabilistic or deterministic models. The edges correspond to variables and these variables determine the format of the messages which need be passed on the edges iteratively in order to obtain the requisite marginal's.

The essential steps in the factor graph solution are as follows:
1. Draw the requisite block diagram
2. Derive the factor graph based on the block diagram
3. Specify variable/message types
4. Define node functions in detail
5. Derive message update rules
6. Define a message update schedule.

In another embodiment, a factor graph based technique is implemented based on matrix formulation. In this embodiment, the matrix formulation of blind source separation is implemented to arrive at factor graphs as required. Specifically, in this embodiment, the system enables to formulate the problem as a blind source separation (BSS) problem. The objective of the BSS is to estimate the loads based on observed feature vectors and some a priori information about the loads. For example, in simple case a priori model can be a linear predictor. The system is modeled as a linear Multiple Input Multiple Output (MIMO) system as:

$$f = A \cdot s + n$$

where f denotes the observed feature vector, A denotes the mixing matrix, s denotes the vector of source signals and n denotes the vector of noise values. The linear mixing of source signals is modeled by using factor graphs and iterative sum-product kind of algorithms are used to estimate the sources. These implementations of factor graph techniques based on the load block diagrams and the matrix formulation to solve the composite load disaggregation problem have been leveraged through a similar factor graph based analysis proposed by Volker Maximillian Koch in the thesis titled "A Factor Graph Approach to Model Based Signal Separation" published in February 2007, wherein the thesis facilitates the integration of action potential shape information, firing statistics, multiple channels, and other properties of electromyographic (EMG) signals into the same model for EMG signal analysis.

We claim:

1. A computer implemented method for optimizing a composite load disaggregation in an electrical environment, the method comprising:
   performing a factor-graph analysis on one or more input variables to generate confidence measures for one or more appliances in the electrical environment, wherein the confidence measures indicate at least one appliance from the one or more appliances being switched on at an instance, wherein the factor-graph analysis is implemented based on matrix formulation of blind source separation or based on load block diagram;
   retrieving contextual information impacting the usage of the one or more appliances from a contextual information database; and
   optimizing the composite load disaggregation, by applying one or more rules to the confidence measures and to the contextual information for identifying at least one appliance from the one or more appliances, and wherein conflicts in decision of identifying least one appliance from the one or more appliances is resolved based on the optimized composite load disaggregation through the factor-graph analysis.

2. The method of claim 1, wherein the one or more input variables comprises one or more features and a set of priori data corresponding to the one or more appliances.

3. The method of claim 2, wherein the one or more features comprises combination of features including active/reactive power levels, power factors, harmonic distortions and transient signatures.

4. The method of claim 3, wherein the one or more features are extracted by two steps approach comprising:
   obtaining a set of signatures corresponding to one or more appliances based a set of parameters from electric current data; and
   modifying a signature from the set of signatures associated with a particular appliance to obtain one or more features.

5. The method of claim 2, wherein the set of priori data indicates a probability of the at least one appliance from the one or more appliances being switched ON/OFF.

6. The method of claim 5, wherein the probability of the at least one appliance being switched ON/OFF is determined by analyzing a plurality of factors selected from a group of information consisting of time of day, day of week, operational interdependencies among plurality of appliances, plurality of appliances of same type (same make and model), family size, house size, dwelling type (Apartment or detached house), geography, season, weather conditions and individual appliance rating.

7. The method of claim 1, wherein the factor-graph analysis is performed on the one or more input variables using at least one message passing algorithm comprises at least one of a sum-product algorithm and a max-sum algorithm.

8. The method of claim 1, wherein the contextual information comprises a combination of information including time of the day, weather conditions, geography and operational interdependencies among the one or more appliances.

9. The method of claim 1, wherein the rule engine comprises one or more rules configured to optimize the composite load disaggregation result for identifying at least one appliance from the one or more appliances.

10. The method of claim 1, wherein the one or more appliances can be combined to form at least one hierarchical virtual appliance, wherein the at least one hierarchical virtual appliance is then subjected to the composite load disaggregation.

11. The method of claim 1, wherein the one or more input variables are obtained from one of either an intrusive load monitoring method, or a non-intrusive load monitoring method, or a hybrid method including combination of intrusive and non-intrusive methods.

12. A system for optimizing a composite load disaggregation in an electrical environment, the system comprising:
    at least one processor; and
    a memory coupled to the at least one processor for executing a plurality of modules present in the memory, the plurality of modules comprising
    an input module configured to receive one or more input variables;
    a factor-graph module configured to perform a factor-graph analysis on the one or more input variables to generate confidence measures for one or more appliances in the electrical environment, wherein the confidence measures indicate at least one appliance from the one or more appliances being switched on at an instance, wherein the factor-graph analysis is implemented based on matrix formulation of blind source separation or based on load block diagram;
    a contextual information database configured to store contextual information impacting the usage of the one or more appliances;
    a rule engine, configured to optimize the composite load disaggregation by applying one or more rules to the confidence measures and to the contextual information for identifying at least one appliance from the one or more appliances and wherein conflicts in decision of identifying least one appliance from the one or more appliances is resolved based on the output of the optimized composite load disaggregation through the factor-graph analysis;

a priori database, configured to store a set of priori data;

a rule database, configured to store one or more rules for optimizing the composite load disaggregation result.

13. The system of claim 12, wherein the contextual information database is configured to store combination of information consisting time of the day, weather conditions, geography and operational interdependencies among plurality of appliances.

14. The system of claim 12, wherein the factor-graph module is further configured to generate a dynamic factor graph depicting the composite load disaggregation using at least one variable as a function of time.

15. A non-transitory computer readable medium having embodied thereon a computer program for optimizing a composite load disaggregation in an electrical environment, the computer program product comprising:

a program code for performing a factor-graph analysis on one or more input variables to generate confidence measures for one or more appliances in the electrical environment, wherein the confidence measures indicates at least one appliance from the one or more appliances being switched on at an instance, wherein the factor-graph analysis is implemented based on matrix formulation of blind source separation or based on load block diagram;

a program code for retrieving contextual information impacting the usage of the one or more appliances from a contextual information database; and a program code for optimizing the composite load disaggregation by applying one or more rules to the confidence measures and to the contextual information for identifying at least one appliance from the one or more appliances and wherein conflicts in decision of identifying least one appliance from the one or more appliances is resolved based on the output of the optimized composite load disaggregation through the factor-graph analysis.

* * * * *